United States Patent [19]

Joseph

[11] Patent Number: 5,721,848

[45] Date of Patent: Feb. 24, 1998

[54] METHOD AND APPARATUS FOR BUILDING EFFICIENT AND FLEXIBLE GEOMETRY MANAGEMENT WIDGET CLASSES

[75] Inventor: Joshy Joseph, San Francisco, Calif.

[73] Assignee: Oracle Corporation, Redwood Shores, Calif.

[21] Appl. No.: 689,355

[22] Filed: Aug. 7, 1996

Related U.S. Application Data

[63] Continuation of Ser. No. 192,278, Feb. 4, 1994, abandoned.

[51] Int. Cl.⁶ ................................................ G06F 15/00
[52] U.S. Cl. ...................... 395/339; 395/334; 395/342; 395/347; 395/356
[58] Field of Search ........................... 395/326, 333–335, 395/339, 340, 342, 346, 347, 348, 352–354, 356, 357, 301; 345/113, 118, 119, 120

[56] References Cited

U.S. PATENT DOCUMENTS

| | | | |
|---|---|---|---|
| 4,642,790 | 2/1987 | Minshull et al. | 364/900 |
| 4,800,510 | 1/1989 | Vinberg et al. | 364/521 |
| 4,802,104 | 1/1989 | Ogiso | 364/518 |
| 4,815,029 | 3/1989 | Barker et al. | 364/900 |
| 4,823,303 | 4/1989 | Terasawa | 364/521 |
| 5,060,170 | 10/1991 | Bourgeois | 364/521 |
| 5,146,553 | 9/1992 | Noguchi et al. | 395/146 |
| 5,179,700 | 1/1993 | Aihara et al. | 395/650 |
| 5,187,786 | 2/1993 | Densmore et al. | 395/603 |
| 5,195,178 | 3/1993 | Krieger et al. | 395/157 |
| 5,227,771 | 7/1993 | Kerr et al. | 340/731 |
| 5,230,072 | 7/1993 | Smith et al. | 395/600 |
| 5,243,519 | 9/1993 | Andrews et al. | 364/419.05 |
| 5,315,703 | 5/1994 | Matheny | 395/164 |
| 5,335,320 | 8/1994 | Iwata | 395/155 |
| 5,416,895 | 5/1995 | Anderson | 395/148 |
| 5,446,842 | 8/1995 | Schaeffer | 395/200.01 |
| 5,596,702 | 1/1997 | Stucka et al. | 395/340 |
| 5,615,326 | 3/1997 | Orton et al. | 395/356 |

*Primary Examiner*—Kee M. Tung
*Assistant Examiner*—U. Chauhan
*Attorney, Agent, or Firm*—Blakely, Sokoloff, Taylor & Zafman

[57] ABSTRACT

The present invention identifies and separates the spatial grouping element from the management element in a geometry management scheme. The management element provides a constraint-resolution engine. A spatial grouping element can describe spatial groupings for graphic user interface (GUI) elements. A spatial group captures and encapsulates the set of constraints that describe the layout of a small portion of a user interface. A higher level spatial group can capture the constraints among the other spatial groups. The present invention provides independent, lightweight spatial-grouping elements that are incorporated into the constraint language of a geometry manager. Further, the present invention allows a GUI component to be grouped with multiple spatial-grouping elements. The present invention restricts the effect of a grouping element to a subset of the available set of dimensions. The present invention minimizes the number of geometry management elements. The present invention provides the ability to introduce geometry management to an existing application with minimal disruption. Further, the present invention postpones the addition of geometry support until after a static layout is perfected. The present invention allows a GUI application to perform dynamic layout alterations to adapt an application's layout to the configuration of a specific graphical environment. Further, the present invention allows an application to easily respond to window resizing. The present invention determines a new layout of a resized window based on previously-specified constraints. Further, the present invention can accommodate length variances resulting from internationalization of a text string.

20 Claims, 4 Drawing Sheets

WINDOW
|
CONTENT
VIEW
|
VIEW
|
BOX
VIEW
|
CONTENT
STACK
|
STACK
|
VIEW

METHOD AND APPARATUS FOR BUILDING EFFICIENT AND FLEXIBLE GEOMETRY MANAGEMENT WIDGET CLASSES

This is a continuation of application Ser. No. 08/192,278, filed Feb. 4, 1994, now abandoned.

BACKGROUND OF THE INVENTION

1. Field of the Invention

This invention relates to efficient and flexible geometry management of graphic user interfaces.

2. Background Art

To be portable, a graphical application must be able to adapt to various hardware and software platforms. For example, many popular software applications must be able to execute under Motif, Microsoft Windows, and Apple Macintosh platforms. Further, an application must be able to accommodate such hardware variances as screen resolution. Hardware and software variations (e.g., differing platforms and hardware specifications) can result in problems when attempting to develop a universal graphic GUI. For example, a variation in screen resolution can result in a disproportionate screen (i.e., GUI) layout. To provide a portable software application, variations in hardware or soft-ware platforms must be addressed by the software application.

Layout problems can also arise when a window in a graphics user interface (GUI) application is resized. In this case, a graphics application should dynamically determine the contents of a window while maintaining the visual design of a window. Resizing is further complicated because each window has a different static layout behavior as well as a dynamic layout behavior. This problem is further complicated when the application must consider multiple hardware and software platforms.

The internationalization of GUI applications raises additional layout considerations. During internationalization, for example, a displayable text string is translated to another language. The translation process can result in a length variation between the original and translated strings. The size and position of the components of a display must be resized and repositioned to accommodate the variance in the string length, and to maintain the visual integrity of an application.

A geometry manager is a user interface (UI) component class that provides a general mechanism for dealing with layout problems. A geometry manager consists of a constraint language for specifying the relative positions and sizes of GUI elements (e.g., prompt field or input field). Further, a constraint language can be used to indicate the resizing behavior of GUI components. Further, a geometry manager provides a constraint-satisfaction capability to generate a layout at runtime.

However, existing geometry managers are platform-specific. That is, the capabilities provided by an existing geometry manager are dependent on a specific hardware and software platform. Platform-specific geometry managers do not distinguish between the "management element" and the "spatial grouping element."

Because of their inability to distinguish between the management element and the spatial grouping element, existing geometry managers are unable to handle many commonly-occurring layout problems. The performance level of these geometry managers when attempting to address common layout issues is unsatisfactory. It is difficult to introduce some or additional geometry management into existing applications without considerable modification of the existing application. It is also difficult to make iterative refinements to a static GUI layout of an application.

The following are patents related to graphic layout schemes and windowing schemes.

Minshull, et al. U.S. Pat. No. 4,642,790 discloses an interactive display system that includes a display terminal. Using the display terminal, a user displays data contained in windows on formatted application data in selected viewports on the screen. The system further includes both real and virtual storage. A presentation interface service dynamically loads the entire formatted data of each application into the storage as it is invoked by the user. A screen manager maps the data contained in the defined windows into locations of a programmable symbol refresh buffer determined by the corresponding position of viewports on the screen defined by the user and through which the windows are to be viewed.

U.S. Pat. No. 4,800,510 to Vinberg, et al. recites a method and system for programmed control of computer generated graphics layout. It provides high-level control of the layout of computer-generated graphs. The system adjusts detail design parameters that specify layout attributes of a graph. The adjustments are done automatically in response to values of design control parameters. The parameters are selected by a user to effect choices made by the user regarding the layout design of a graph. For a graph being designed, the selected design control parameter values control the selection of specific detail design parameter values. The selected design control parameter values are selected from tabularized groups of graph detail design parameters, and are provided to a graph production process. The values enable the graph production process to control an output device used in producing a graph. The graph is laid out according to the choices of the user.

U.S. Pat. No. 4,802,104 to Ogiso presents a dual screen document processing system including a display unit containing first and second displays, a storage unit, an indication unit, and an edition unit. The first display shows document information. The second display presents layout information representative of the output form of the document information displayed on the first display. The storage unit stores the document information. The indication unit indicates performance of an edition of the displayed layout information by directly processing the second display. An edition trait is used for editing the layout information at the second display end based on the indication by the indication unit. Ogiso is directed to a document processing system for editing a document displayed on one display and displays the layout of an edited document on a second display.

Barker, et al. U.S. Pat. No. 4,815,029 describes an "in-line, dynamic" editor for mixed object documents. It provides a method for editing documents containing mixed object types on a computer work station. The mixed object types include: text objects, draw graphics objects, business graphics objects, and tables objects. The editor executes actions on use selected objects and attributes based on internal knowledge of the object type selected rather than by explicit user commands. This procedure provides an interface to the user for transparently manipulating objects and attributes as well as executing commands.

Terasawa, U.S. Pat. No. 4,823,303 recites a display control apparatus for use in a composite document processing apparatus. The composite document processing apparatus includes a CPU, document memory, attribute memory, a window/viewport memory, and a video memory. The document memory stores data of a composite document. The attribute memory stores attribute data including the location in the composite document, the area size, and the type of each data stored in the document memory. The window/viewport memory stores display attribute data including the size of a window and the size of a viewport. The video memory stores display data in image form. This apparatus further includes a display device. First and second viewports are defined on the display device. Using the above two types of attribute data, the CPU contracts the display data in a first window area. The first window area is set for the entire document stored in the document memory. The CPU develops the data in the video memory in image form so that the display area in the first window area is displayed in the first viewport. The first viewport defines a display area smaller than the first window area. Based on these attribute data, the CPU also performs an equal enlargement or a greater enlargement of the contents of a second window area. It also develops the enlarged data in the video memory in an image form so that this data can be displayed in the second viewport. The CPU responds to the updating of the contents of the second viewport to update the corresponding portion of the first viewport in real-time.

U.S. Pat. No. 5,060,170 to Bourgeois, et al. describes a space allocation and positioning method for screen display regions in a variable windowing system. A window is a viewing area on a video display that is used in display screen or system technology. The window may be the full screen region or smaller region represented within a border. It is typically of rectangular shape in which data from application programs may be written for display. One or more windows appear on the face of a video display screen. The variable size of the window areas are selected by the operator. Re-sizing of the regions or areas within each variable window must be modified to suit the newly selected window size. Several attributes are associated with the regions to be placed within a given window. These attributes include those for relative priority of display within the window, location within the window, and the minimum dimensions of each region to be included within the window. Program controlled operations examine the minimum specifications for the regions to be displayed within a window. This is done in comparison with the operator-selected window size in which the regions are to be displayed. The program controlled operations apportion the available window space among the regions to be displayed. In accordance with their relative priority in location in the window in their specified minimum sizes. The program controlled operations further generate the controlled perimeters necessary for recreating the window display with the appropriate regional spaces allocated and located within the window. Bourgeois, et al. is directed to a windowing system that allows windows to be resized by a user.

U.S. Pat. No. 5,146,553 to Noguchi, et al. presents a document editing apparatus that activates application programs in response to document data that is input. A user activates a document editing program or editing document data with the aid of an input device and the display. The editing document data includes character strings, graphics, and image data. During addition of the document data by the operator, application programs are activated. The operator can write the characters, graphics, and others into the document data being edited by making use of the application programs. This system is directed to editing documents including complicated mathematical expressions and patternized text.

Aihara, et al. U.S. Pat. No. 5,179,700 recites an interactive user interface customization apparatus. This is an interactive computer system for converting user interface presentations from a first applications specified format to a second user specified format. The system accepts application program output that is designed to be displayed on a target type of computer system terminal. It converts the display to a user specified form prior to actually displaying it. Using conversion apparatus, the user may specify a customized format for presentation of the data to take advantage of the capabilities of a particular display device employed by the user. The system analyzes the application program output, and converts the output to a form required by the customized interface. It displays the resulting output on the user display device. The system is able to accept data input and commands from the user display device, convert them into a format required by the application program, and transmit that input or command to the application program. The present invention allows adaptation from one format to another and from one language to another. All changes are accomplished without changing the base application program. This system is directed to converting output specified for a first terminal to suitable format for display on a second type of terminal.

Krieger, et al. U.S. Pat. No. 5,195,178 presents an adaptive window system for dynamically modeling information systems. It is a computer system for establishing an adaptive window system within a dynamic model of information systems of organization. The system includes a plurality of editors that enable a user to interact with the system. The window system includes predetermined criteria. Design data of one or more of the editors is compared against the predetermined criteria. An options window displays those options that meet the criteria at any time during the model building process. The criteria generally correspond to syntactically permissible options. The user interacts with the system via text, tree diagram, or other graphical representations. Such representations also enable the user to dynamically interact with the system.

U.S. Pat. No. 5,230,072 to Smith, et al. recites a system for managing hierarchical information in a digital data processing system. The system is used in conjunction with the digital data processing system including an applications program, a user interface, a hierarchy information management system. The applications program generates an information hierarchy including a plurality of hierarchy information items. The hierarchy information items are organized in a plurality of hierarchy levels. The user interface includes a display for displaying information to a user. It also includes an event initiator, such as a keyboard or a mouse, for generating event information. The hierarchy information management system receives hierarchy information items at selected hierarchy levels from the applications program. It also transmits the received hierarchy information items to the display of the user interface for display. It responds to the event information by initiating selected operations in connection with the received hierarchy information.

U.S. Pat. No. 5,227,771 to Kerr, et al. describes a method and system for incrementally changing window size on a display. A window displayed on a user interface is incrementally enlarged or reduced by selecting an appropriate sizing icon. The present invention provides an enlarged icon and a reduced icon in the window title bar. To re-size the window, the user selects the appropriate icon with a cursor. The window changes its border size accordingly to a predetermined incremental value. The data displayed inside of the newly sized window is determined and then displayed. By continuously selecting one of the sizing icons, the window will continuously size in an incremental manner until the user terminates the selection or until the maximum or minimum window size limits are reached. As the window is re-sized, the cursor remains attached to the selected icon. During re-sizing of the window, one border corner is fixed in position on the interface while the opposite border corner is moved. Kerr, et al. is directed to the way that windows are resized. Specifically, windows are incrementally resized by clicking on icons in contrast to minimum/maximum icons and dragging methods.

Andrews, et al. U.S. Pat. No. 5,243,519 discloses a method and system for language translation within an interactive software application. The control perimeters associated with each text field within an interactive software application prior to translation. It is utilized to automatically extract each text field for translation and to reinsert translated text field subsequently. In certain interactive software applications that utilize fixed template user-interface structures, the architecture does not permit captions or menu pull down controls to be identified within the template. Fixated template user-interface structures include dialogue boxes or menu templates. In such applications, an additional artificial control parameter is included within the template that contains an identifier of the text field for the caption or menu pull down control. The control perimeters are utilized to automatically extract text fields for translation. An attempted automatic extraction of text fields for translation in an application results in an error message in the absence of the required artificial control parameter. The text fields for translation in an application include dialogue boxes or menu templates.

SUMMARY OF THE INVENTION

The present invention identifies and separates the spatial grouping element from the management element in a geometry management scheme. The management element is a class that provides a constraint-resolution engine. A spatial grouping element is a mechanism to describe spatial groupings for GUI elements. A spatial group captures and encapsulates the set of constraints that describe the layout of a small portion of a user interface. A higher level spatial group can capture the constraints among the other spatial groups.

The present invention provides independent, lightweight spatial-grouping elements. These elements are incorporated into the constraint language of a geometry manager. Further, the present invention allows a single GUI component to be grouped with multiple spatial-grouping elements. The present invention provides the ability to restrict the effect of a grouping element to a subset of the available set of dimensions.

The present invention can handle common layout problems that other geometry managers cannot. The present invention minimizes the number of geometry management elements in a hierarchy of GUI elements. The geometry management capabilities of the present invention can be easily turned off (e.g., when debugging a UI application). The present invention provides the ability to introduce geometry management to a working application with minimal disruption to the existing application. Further, the present invention enables postponement of the addition of geometry support until after a static layout is perfected.

The present invention provides the ability for a UI application to perform dynamic layout alterations (at runtime) to adapt an application's layout to the configuration of a specific graphical environment (e.g., hardware and/or software platform) in which an application is running. Further, the present invention allows an application to more easily respond to window resizing. The present invention determines a new layout of a resized window based on previously-specified constraints. Further, the present invention can accommodate length variances resulting from the internationalization of a text string.

BRIEF DESCRIPTION OF THE DRAWINGS

FIG. 2 illustrates a hierarchy of structures.

DETAILED DESCRIPTION OF THE INVENTION

A method and apparatus for efficient and flexible geometry management of graphic user interfaces is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
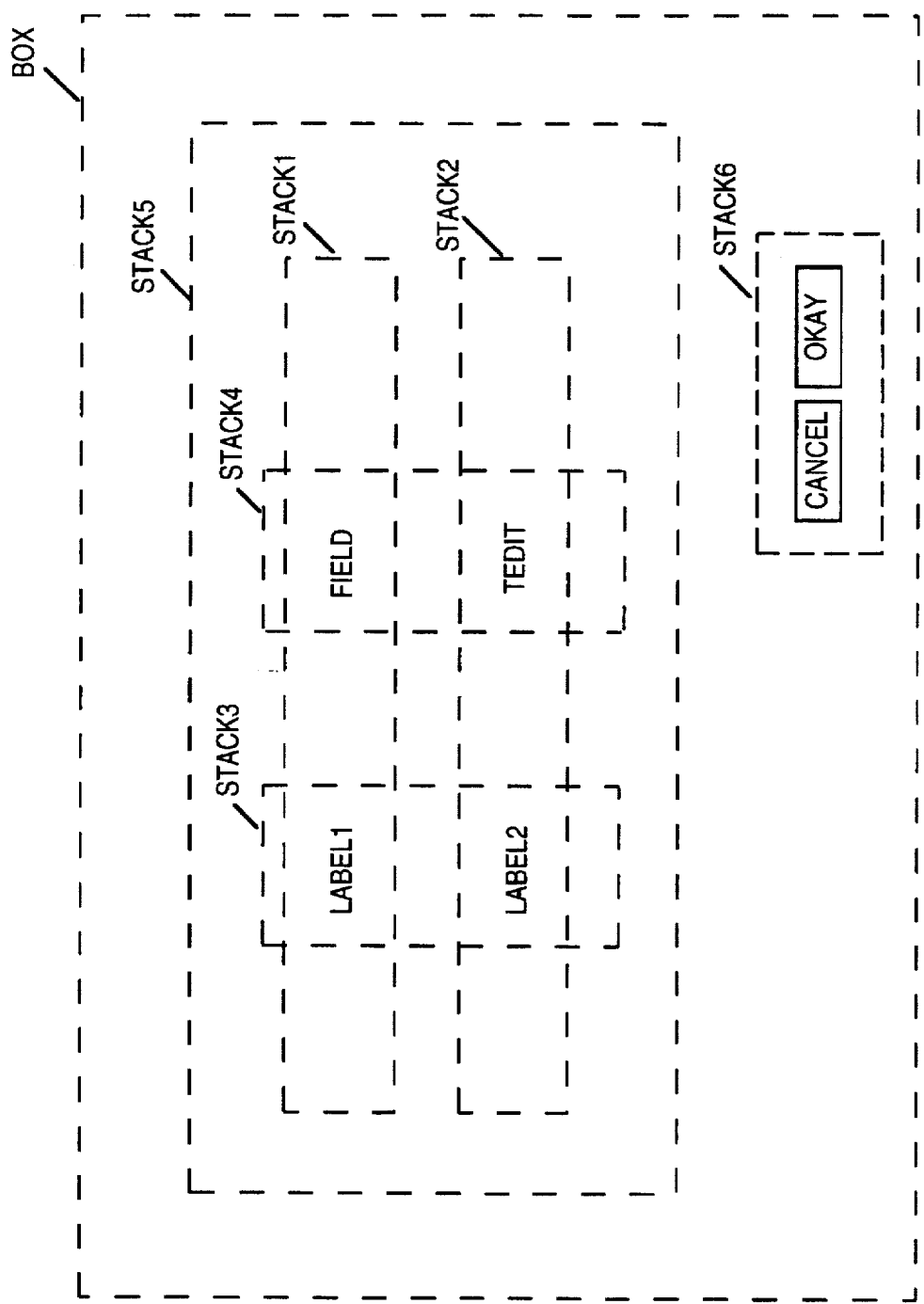
FIG. 1 provides an example of a dialog window.

FIG. 1 provides an example of a dialog window. In this example, the dialog window's elements have associated constraints. The label1 and label2 components are right-aligned. The field and tedit components are left-aligned. Further, label1, label2, tedit and field are aligned at the baseline. Label1 is positioned to the left of field. Label1, label2, and field are of a fixed size. Tedit's height and width change in response to resize events (i.e., events that warrant a resizing of the components of the window); however, the height and width values must maintain a height-to-width ratio of one.

The buttons (i.e., "cancel" and "ok") are aligned with each other at the top and bottom. Further, the buttons have the same width. The width of the buttons is the minimum necessary to make the buttons' labels visible. The sparing between the buttons is to be preserved. The space between the right side of the "ok" button and right side of the (content of the) window is to be fixed. Similarly, the space between the bottom side of the buttons and the bottom side of the (content of the) window is to be fixed.

These constraints can be established using the components illustrated in FIG. 1. The window's content view is of class box. Its content stack is a vertical stack containing stack1, stack2, stack5 and stack6. Stack1 is a horizontal stack managing only the "Y" dimension of the view stacks that manage label1 and field. The "usebaseline" attribute for the view stacks managing label1 and field can be set for baseline alignment. Stack1 has a common constraint to flush its children to the top.

Stack2 is a horizontal stack managing the "Y" dimension of view stacks that manage label2 and tedit. View stacks that manage label2 and tedit have their "usebaseline" attribute set for baseline alignment. Stack2 has a common constraint to flush its children to the top. Therefore, stack2 has a top spring to constrain its position with respect to stack1. Stack5 is a horizontal stack managing only the "X" dimension of stacks stack3 and stack4. Stack3 is a vertical stack managing only the "X" dimension of view stacks that manage label1 and label2. Stack3 has a common constraint to flush its children to the right.

Stack4 is a vertical stack managing only the "X" dimension of view stacks that manage field and tedit. The view stack that manages tedit can have an aspect ratio attribute set to 100. Stack4 has a common constraint to flush its children to the left. Stack4 can have a left spring to constrain its position with respect to stack3.

Stack6 is a horizontal stack managing both "X" and "Y" dimensions of the view stacks that manage the buttons (i.e., "cancel" and "ok"). Stack6 can have a bottom spring to maintain the spacing between its bottom side and its parent. Further, stack6 can have a right spring to maintain the spacing between its right side and its parent. Stack6 has common constraints that flush its children to the bottom, flush its children to the top, and assure that its children have the same "correct" width. A special length value, maximum siblings, that specifies that the maximum for all siblings and self in the same dimension. The view stack that manages the "ok" button can have a left spring to maintain a fixed distance from the "cancel" button. A right spring can be used to flush view stack with the right side of stack6.

BOX VIEW

The present invention provides a client-defined view class, "box", to handle geometry management. The box view class manages members of the box view class based on spatial constraints imposed on them. Attribute structures and runtime procedures constitute the constraint language.

The constraint language is based on stacks and springs. Stacks are light-weight objects which allow spatial grouping of views. Stacks provide the ability to capture the logical clustering of views. Stacks act as efficient constraint solvers. Stacks are rectangular objects like views. Their position and size is not explicitly set. A stack acquires position and size based on the constraints placed on the objects it manages and itself.

A box data structure can consist of a mask, content attributes, "canresize" flag, "canremap" flag, layout policy, resize policy, a layout tolerance for width, and a layout tolerance for height. The mask element can specify whether elements of the box data structure have been set. For example, a mask may indicate that the content, "canresize" and layout policy elements are set. The "canresize" and "canremap" flags can be used to indicate whether resize or remap operations may be performed on a box.

Layout tolerances specify the tolerances within which any differences in a precomputed (i.e., precompiled) layout and a runtime layout are ignored. A tolerance can be specified in terms of an absolute difference in width or height, or as a percentage of change. When specified by the layout policy attribute value, an initial layout is performed during the startup of an application. During initial layout, the initial geometry management structure is initialized based on the current platform (i.e., hardware and software environments).

If the layout policy is set to "always," for example, an initial layout is performed. If the layout policy is set to "never," all of the positions in a layout are precompiled and there is no need to compute an initial layout. To illustrate further, consider the case when the layout policy is set to "either," the width tolerance is specified in terms of an absolute value of twenty, and the height is specified in terms of a percentage of change and is set to ten. In this case, an initial layout operation is performed at startup time. However, the children of the box view are repositioned and resized only when either the absolute difference in runtime-computed and precomputed box width is greater than twenty, or the percentage of change in the computed height of the box view from the precomputed value is greater than ten.

Thus, the layout policy element can indicate whether an initial layout is performed. For example, it can indicate whether an initial layout is performed, or that a layout is to be performed only when a change in the width and/or height exceeds the corresponding tolerance. The value of this attribute can have significant impact on the start up time of a box view. For example, a layout can be precompiled. Then, any resizing and repositioning can be computed if the precomputed layout is different from the one computed at runtime. This feature can be used, for example, when a precompiled layout is shared by multiple instances of an application running in differently configured graphical environments. In such a situation, the resources could be precompiled for the predominant configuration.

A resize policy element can indicate whether or not a resize operation is to be automatically performed. The attribute "rpolicy" can be used to specify automatic resize handling. If the resizing is set to "always," a relayout of the children of the box view occurs in response to RESIZE events. The resizing policy attribute is independent of the layout policy attribute. Therefore, for example, a layout policy can indicate that a relayout is never performed while the resizing policy can specify that a resize operation is always performed.

A spring represents a constraint on the distance between two stack sides. The two stack sides can belong to the same stack or different stacks. Spring distances are based on the distance between two parallel sides. A spring is specified by a preferred, or natural, length of the spring and the degree to which the spring can shrink or stretch from this natural length. An elasticity value determines the rate at which a spring can change its length in relation to the other, connected springs.

Spring lengths and elasticities are normally positive values. However, negative values can be used to employ special functions to dynamically compute lengths and/or elasticities. Customized routines can also be developed. The process in which stacks compute default height and width springs can be overridden by the constraints placed on their children.

Using the constraint language, the position of a view is not expressed in absolute terms, but relative to siblings or a parent in a structural hierarchy. Thus, a constraint can be placed on the relative layout of a group of views using a hierarchy. That is, a group of views can become children of a box view. Further, stacks and springs can be used to determine and limit relative layouts.

FIG. 2 illustrates a hierarchy of structures. Window is a top level object. Within window, an application can draw application-specific objects that are contained in content view. Content view can contain a view (or multiple views). Examples of a view include a text label or text edit element. Box view introduces stacks between itself and child stacks. Box view can handle resize events by fairly distributing an increase or decrease in its size among the springs. Content stack provides the ability to group stacks. Stack provides the ability to create small groups of controls. Further, if layout issues are grouped within stacks, the number of permutations of interrelated layout issues is reduced.

When a window containing a box view is to be displayed, a routine can be executed to determine an initial layout. A bottom-up technique can be used to compute a view. Further, stack position and size are determined such that all spring lengths conform to spring constraints and retain as much of their natural lengths as possible. This may result in a re-layout of children to conform to the constraints. Further, it may be necessary to resize the box view. Whether the view is actually resized is controlled by a canresize attribute. This runtime relayout can resolve problems resulting from, for example, translations or missing fonts.

Stack

A stack can be a container containing other stacks or a view. A stack includes the constraints on its position and size. If the stack is a container, it can be either vertical or horizontal. A horizontal stack manages children that are spatially arranged from left to right. Similarly, a vertical stack manages children that are spatially arranged from top to bottom.

A stack can be the child of a single other stack if it is not the content stack of a box. Typically, a view is managed by one stack. However, it is possible for a view to have constraints imposed on it by multiple, different stacks. For example, a horizontal stack can manage horizontal dimensions and a vertical stack can manage vertical dimensions. A stack can manage horizontal, vertical or both dimensions.

Children of a stack can manage a subset of the dimensions managed by its parent. Therefore, the only children that can be used by a parent when resizing in a particular dimension are the children that manage the same dimension. For example, assume stack1 has children stack2, stack3 and stack4. Further, stack2 is a dimension "X" stack, stack3 is a dimension "Y" stack and stack4 is both a dimension "X" and dimension "Y" stack. If stack1 must distribute its width among the springs attached to its children, stack1 can consider stack2 and stack4. Because stack3 is a dimension "Y" stack, stack3 is not considered in a horizontal resize operation.

Stacks of type view have attributes for enabling baseline alignment support and aspect-ratio support. When a "usebaseline" attribute is set to TRUE, the top side of the stack is taken to be where the baseline of the (first line of text in the) view is. If an "aspectratio" attribute is set, a view's height to width ratio is determined to be aspectratio/100 even when resize events occur.

Constraints can be attached to a stack. Any common constraints attached to a stack apply to all the stack's children stacks. However, a parent's (i.e., common) constraint can be overridden for any child stack by defining a constraint for a child. The combined use of common constraints and multiple stacks for a view result in very compact and powerful constraint sets.

Stacks are referenced with respect to another stack using the qualifiers: first, last, next, and previous. The following table illustrates typical references for each stack type:

| Stack Type | First | Last | Next | Previous |
|---|---|---|---|---|
| Vertical | top most | bottom most | immediate below | immediate above |
| Horizontal | left most | right most | immediate right | immediate left |

To illustrate, a vertical stack referencing a first stack must reference the top-most stack. Further, a horizontal stack, to reference the next stack, references a stack to the immediate right of the referencing stack.

A stack data structure can contain the following general elements: mask, type, spring count, spring array, and aspect ratio. The mask can be used to indicate the other elements used. For example, a mask value may indicate that the type, aspect ratio, spring count, and spring array elements have been set. A spring count element indicates the number of springs associated with the stack. A spring array contains the spring information associated with the stack's spring(s). Aspect ratio is the relationship between the height and width of the stack multiplied by one hundred.

If the stack is of type view, a flag attribute, usebaseline, can be used to specify whether the baseline (i.e., first line of text with the view) is considered the top side of the stack. If the stack is of type vertical or horizontal, a dimension element can indicate whether the stack is none, horizontal, vertical or both. Further, a common spring count and a common spring array element indicate the number of common springs and their associated information, respectively.

Spring

Constraints for the position and size of a stack with respect to its parent and siblings are expressed using springs. Springs have natural length, shrink length, stretch length and elasticity attributes associated with them. Shrink and stretch attributes specify the degree to which an actual length can deviate from the natural length. For example, if a spring has a natural length of 50, shrink value of 20, and stretch value of 30, the length of the spring can vary between 30 and 80. Changes in length are controlled by elasticity and the current length.

Figure 3:
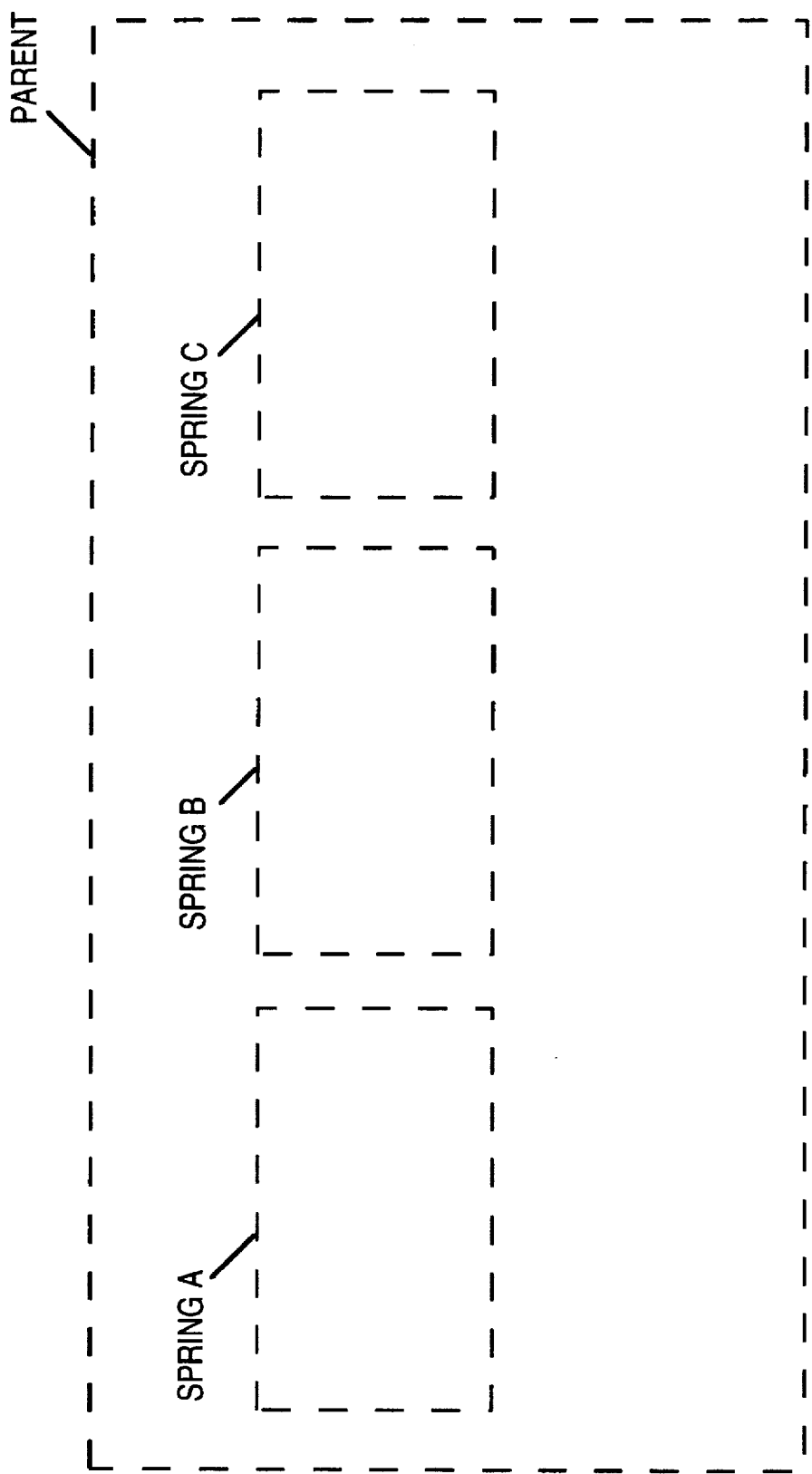
FIG. 3 illustrates a parent stack with associated child and springs.

FIG. 3 illustrates a parent stack and a child stack with three springs. Spring A connects the child to the parent on the left side of the parent. Spring B contains the width information for the child. Spring C connects the child to the parent on the right side of the parent. The following indicates the natural, shrink, stretch, and elasticity values (n.b., the length values can be specified in terms of inches, characters or any other unit of measurement) for the three springs:

|  | Natural | Shrink | Stretch | Elasticity |
|---|---|---|---|---|
| Spring A | 10 | 2 | 4 | 50 |
| Spring B | 20 | 0 | 0 | 50 |
| Spring C | 20 | 4 | 8 | 50 |

Any change in the parent's length can be distributed among the three child springs. The distribution is a function of the child springs' length values. For example, if the parent's stack increases by 6 units, the length can be distributed among the child's three springs. Spring A's length can be increased by two units and spring C's length is increased by four units. Because Spring B does not allow for any shrink or stretch (i.e., the shrink and stretch values are zero), Spring B is unchanged. The formula used to calculate the length variations is as follows:

$$variation = (Var_n/VarSum)*Change,$$

where:

$Var_n = NaturalLength_n*(Elaseicity_n/100)$ n: indicates the current spring

VarSum = the sum of the variances, $Var_n$, for all springs considered

Change = the change to be distributed among the springs

Using this formula for spring A–C:

Spring A's variation=((10*50/100)/((10*50/100)+(0*50/100)+(20*50/100)))*6=2

Spring B's variation=((0*50/100)/((10*50/100)+(0*50/100)+(20*50/100)))*6=0

Spring C's variation=((20*50/100)/((10*50/100)+(0*50/100)+(20*50/100)))*6=4

Springs are specified between two stack sides. The sides can belong to a stack and to another side of the stack or a parent, sibling, or child of the stack. Participating sides of a spring constraint are specified using the direction of the spring. Spring directions are designated as top, bottom, left, right, width, height, first or last. The participating sides for different spring directions can be visualized given the spatial structure of horizontal and vertical stacks. The following table illustrates the directions.

| Stack-Type | direction | First Child | Last Child | self side | target side |
|---|---|---|---|---|---|
| Vertical | Top | No | — | Top | Bottom of Previous |
| Vertical | Top | Yes | — | Top | Top of Parent |
| Vertical | Bottom | — | No | Bottom | Top of Next |
| Vertical | Bottom | — | Yes | Bottom | Bottom of Parent |
| Vertical | Left | — | — | Left | Left of Parent |
| Vertical | Right | — | — | Right | Right of Parent |
| Vertical | First | — | — | Top | Top of First |
| Vertical | Last | — | — | Bottom | Bottom of Last |
| Horizontal | Left | No | — | Left | Right of Previous |
| Horizontal | Left | Yes | — | Left | Left of Parent |
| Horizontal | Right | — | No | Right | Left of Next |
| Horizontal | Right | — | Yes | Right | Right of Parent |
| Horizontal | Top | — | — | Top | Top of Parent |
| Horizontal | Bottom | — | — | Bottom | Bottom of Parent |
| Horizontal | First | — | — | Left | Left of First |
| Horizontal | Last | — | — | Right | Right of Last |

A spring data structure can consist of the following elements: mask, naturalLength, shrinkLength, stretchLength, elasticity. The mask element can contain a series of bits that further define a spring. Direction indicates the direction of the spring (i.e., top, bottom, left, right, width, height, first or last).

Negative values can be used for special spring lengths. For example, a negative one can indicate infinite length. Elasticity can vary from zero percent elasticity to a hundred percent. Similarly, negative elasticity values can be used to customize elasticity values.

CUSTOMIZATION

As previously indicated, negative distance values can be used to provide hooks to special functions to compute lengths at runtime. For most typical layouts, positive lengths and predefined lengths are sufficient. However, customized functionality can be used. Customized functions can be registered. This process associates a length (e.g., "−205") with a customized function. Once the association is made, the customized length can be used in the same manner as a predefined or positive length. Similar facilities are available for elasticity.

Stack state information is made available to customized length functions. Stack state information includes position, size, and baseline or managed view information.

DEFAULTS

The geometry manager provides appropriate default behavior when springs are not specified. Default behavior is natural and transparent. However, it is useful to know what transpires to determine whether a spring must be specified instead of using defaults. Further, a view of the default behavior is useful to application programmers during the debugging stage.

Where a spring does not specify a height or width, the spring's natural, shrink, stretch, and elasticity values default to 0, 0, −1, 100, respectively. Where if the missing spring is of direction height or width, the stack is of type view and no aspect ratio is specified, the default is <outerht-baseline, 0, 0, 0> for height and <outerwd, 0, 0, 0> for width. Here outerht and outerwd are the view's outer height and outer width, respectively. Baseline is 0 when the "usebaseline" attribute is false. Otherwise, baseline is equal to the view's baseline attribute.

If the stack is of type view and an aspect ratio is specified, height and width springs become constrained by each other. If both are specified then the height spring wins and width spring is derived from it. If either a height or a width spring is specified, the other, unspecified spring is derived from it. If no spring is specified, height gets a natural length equal to outer height baseline and shrink, stretch, and elasticity values are set to zero. Further, the width spring is derived from the height spring.

The present invention further provides default width and height spring computations for container stacks. The computation involves adding a set of springs in series or parallel. For example, the height of a vertical stack is computed as the sum of the top, bottom and height springs on the children connected in series. The width computation of a vertical stack involves the addition of a set of springs, one for each child, which are connected in parallel.

Springs connected in parallel are defined by a minimum length, natural length, maximum length, and elasticity. The combined length and elasticity values for the serially connected springs are computed as follows:

$$\text{minimum length} = \sum_{m=1}^{n} \text{minimum length}_m$$

$$\text{natural length} = \sum_{m=1}^{n} \text{natural length}_m$$

$$\text{maximum length} = \sum_{m=1}^{n} \text{maximum length}_m$$

$$\text{elasticity} = \sum_{m=1}^{n} (\text{natural length}_m * \text{elasticity}_m) / \sum_{m=1}^{n} \text{natural length}_m$$

$n$ = number of serially connected springs

The combined length and elasticity values for the parallel connected springs are computed as follows:

minimum length = max(minimum length$_1$, ..., minimum length$_n$)
natural length = max(natural length$_1$, ..., natural length$_n$)
maximum length = min(maximum length$_1$, ..., maximum length$_n$)

$$\text{elasticity} = \sum_{m=1}^{n} \text{elasticity}_m / n$$

$n$ = number of serially connected springs max and min functions determine the maximum and minimum (respectively) values from the set of values provided.

These computations can be overridden by setting the width or height springs for the stack. The natural length computation of the width of a stack can be customized by setting the natural length to, for example, −105. A customized function can be defined such that the function is invoked whenever natural length for the width of the stack is to be determined. A stack hierarchy can be traversed and the current layout state of the stacks using can be determined.

RESIZING

Resizing is done using a top-down procedure that distributes a change (e.g., an increase) in width or height of a stack among the springs attached to the children of the stack. The distribution procedure assumes that a spring's length can be changed to any value between its minimum and maximum length. In most cases, this is appropriate. However, there may be situations where constraints can not be met.

For example, an inability to meet constraints may occur when a width or height constraint imposed on a stack is in violation of the constraints on its children. One technique for addressing this is to give precedence to the lower level constraints. However, this has two different results depending on when the problem arises. If the problem arises when the window containing the view is first shown, the views are laid out with as many springs as possible in their "natural" configuration even though some higher level springs may violate their constraints. This may result in some views near the right and bottom edges of the window being invisible.

If the problem occurs as a result of a resize operation of a containing window, the existing layout is left untouched. When the window is subsequently resized to a size within the constraints, the views will be laid out correctly.

The present invention manages dynamic relayout when a window is resized. Because resizing is handled in top-down manner, when a box is resized, its children are also resized. However, a parent is not dynamically resized when a child changes its geometry or ceases to be managed. Therefore, when a child is resized, a box view is not automatically resized. Further, if the geometry of a managed view is explicitly changed, it will revert to a preferred geometry when the next resize event occurs.

CONVENIENCE LAYER

The present invention includes a layer of convenient abstractions and functions. In this layer, stacks and springs corresponding to a higher level object (e.g., grid) can be set up by specifying the object attributes. Each of these objects corresponds to a container stack and its children. The stack, the children, and springs among them are set up based on the object attributes.

These higher level objects encapsulate common ways of using groups of stacks. Using them, geometry management for simple applications can be easily developed and there may be no need for explicitly specified springs.

Alignment Groups

An alignment group is a higher level geometry management structure. An alignment group is used for aligning items together. The items in a group can be horizontally-aligned at the top or bottom of the stack. Further, items in a group can be vertically-aligned at the left or right. The items can be views or composite structures.

Information retained for an item in an alignment group includes: a mask, type (e.g., view, group, or grid), normal separation from a previous sibling (if any), view, width fixed flag, height fixed flag, and attributes. The "view width fixed" and "view height fixed" flags indicate whether a view's width or height (respectively) change when an alignment group is resized. Alignment group attributes include: mask, horizontal flag, intraseparation flag (i.e., normal separation between items), alignment, item count, and items. Alignment types include: center, top-left, bottom-right, baseline, and both.

Button Group

A button group is a collection of related push buttons. The buttons will all have the same size (e.g., smallest required for all their labels to be visible). Button group information includes: a mask, horizontal flag, intraseparation, item count, and item attributes.

Grid

A grid is a two-dimensional array of views. The elements in each row or column can be aligned together. Some of the cells can be left empty by not specifying a corresponding view. Grid cell (or item) information includes: mask, view, "view width fixed" flag, and "view height fixed" flag. Further, information associated with a grid includes: the number of columns in the grid, array of columns, the number of rows, array of rows, number of cells, and the array of cells in row-major order. The "view width fixed" and "view height fixed" flags specify whether a view's width or height (respectively) change when a grid is resized. Information associated with a row or column in a grid includes: mask, alignment, and intraseparation.

Convenience Layer Example

Figure 4:
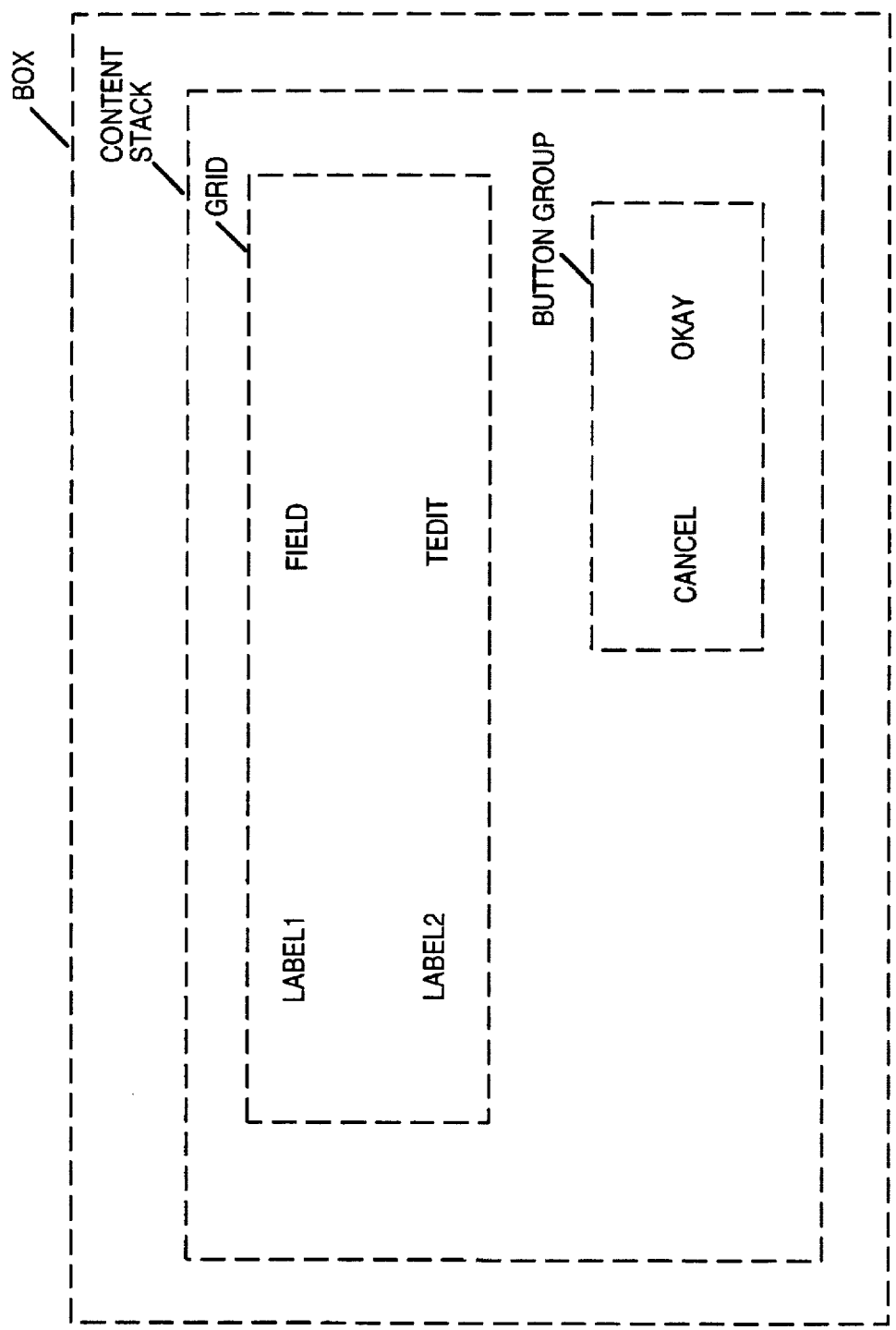
FIG. 4 provides a convenience layer example using higher level objects.

FIG. 4 provides a convenience layer example using higher level objects. The window's content view is of class box. Its content stack is a vertical stack containing a grid and a button group. The grid contains two rows and two columns. The first row contains label1 and field and is aligned at their baseline. Similarly, row 2 contains label2 and tedit. The first column is aligned at the right. The second is aligned at the left. The aspectratio and width and height attributes for tedit are set after the grid is created. The button group is horizontal. It contains two push buttons (i.e., "cancel" and "ok"). It can have a bottom spring to maintain a fixed space between the bottom side of the button group and its parent. A right spring can be used to maintain a fixed space between the right side of the button group and its parent.

PRECOMPILATION

A precompilation can be performed. A precompilation uses, as its input, a resource file. It resolves the layout constraints for each resource in the file. The resource together with its position and size specifications are output to a new resource file. Further, the initial layout computation is "turned off" in the new resource file by setting the "lpolicy" attribute of the box view.

Thus, a method and apparatus for efficient and flexible geometry management of graphic user interfaces has been provided.

I claim:

1. A method of managing a graphical user interface (GUI), the method comprising the steps of:

identifying GUI elements to be displayed on a computer display;

invoking procedures included in a hierarchy of spatial arrangement elements associated with the GUI elements to dynamically generate display position information and size information for each of the GUI elements;

adjusting the display position information and the size information in a constraint resolution engine to determine a respective position on the display and a respective size for each of the GUI elements; and displaying each of the GUI elements on the display according to its respective position and its respective size.

2. The method of claim 1 wherein said step of invoking procedures included in a hierarchy of spatial arrangement elements includes the steps of:

invoking a first procedure included in a first-level spatial arrangement element in the hierarchy;

executing the first procedure to identify one or more additional spatial arrangement elements that are hierarchically lower than the first-level spatial arrangement element; and invoking respective procedures in the one or more additional spatial arrangement elements to generate the display position information and size information for the GUI elements.

3. The method of claim 1 wherein said step of adjusting the display position information and size information in a constraint resolution engine comprises the step of executing a geometry manager associated with a window in which the GUI elements are to be displayed.

4. The method of claim 1 wherein said step of invoking procedures included in a hierarchy of spatial arrangement elements includes the step of invoking procedures to dynamically generate a preferred dimension of each of the GUI elements.

5. The method of claim 4 wherein said step of invoking procedures to dynamically generate a preferred dimension of each of the GUI elements includes the step of generating a preferred dimension of each of the GUI elements based on characteristics of the graphical user interface.

6. The method of claim 5 wherein the characteristics of the graphical user interface include characteristics of computer system hardware.

7. The method of claim 5 wherein the characteristics of the graphical user interface include characteristics of a windowing environment.

8. The method of claim 1 wherein said step of invoking procedures included in a hierarchy of spatial arrangement elements includes the step of invoking procedures to dynamically generate a preferred dimension, a minimum dimension and a maximum dimension of each of the GUI elements.

9. The method of claim 1 further including the step of selectively disabling the constraint resolution engine from adjusting the display position information and size information.

10. The method of claim 1 wherein said step of invoking procedures included in a hierarchy of spatial arrangement elements comprises the step of invoking procedures included in a hierarchy of stacks.

11. The method of claim 1 wherein said step of identifying GUI elements to be displayed on a computer display comprises the step of identifying a hierarchy of GUI elements defined by a window and user-interface control elements to be displayed in the window.

12. The method of claim 11 wherein the hierarchy of spatial arrangement elements associated with the GUI elements is defined by a top-level spatial arrangement element associated with the window and hierarchically lower-level spatial arrangement elements associated with the user-interface control elements.

13. An apparatus comprising:

a processor;

a display coupled to said processor; and a memory coupled to said processor; the memory having stored therein information representing graphical user interface (GUI) elements; and sequences of instructions which, when executed by said processor, cause said processor to manage a layout of the GUI elements in said display by causing said processor to:

identify the GUI elements to be displayed on said display;

invoke procedures included in a hierarchy of spatial arrangement elements associated with the GUI elements to dynamically generate display position information and size information for each of the GUI elements;

adjust the display position information and the size information in a constraint resolution engine to determine a respective position on said display and a respective size for each of the GUI elements; and display each of the GUI elements on said display according to its respective position and its respective size.

14. The apparatus of claim 13 wherein said sequences of instructions which, when executed by said processor, cause said processor to invoke procedures included in a hierarchy of spatial arrangement elements includes instructions which, when executed by said processor, cause said processor to:

invoke a first procedure included in a first-level spatial arrangement element in the hierarchy;

execute the first procedure to identify one or more additional spatial arrangement elements that are hierarchically lower than the first-level spatial arrangement element; and invoke respective procedures in the one or more additional spatial arrangement elements to generate the display position information and size information for the GUI elements.

15. The apparatus of claim 13 wherein the GUI elements to be displayed define a hierarchy of GUI elements including a window and user-interface control elements to be displayed in the window.

16. The apparatus of claim 13 wherein the size information includes a preferred dimension, a minimum dimension and a maximum dimension of each of the GUI elements.

17. The apparatus of claim 13 wherein said sequences of instructions which, when executed by said processor, cause said processor to invoke constraint resolution procedures included in a hierarchy of spatial arrangement elements include instructions which, when executed by said processor, cause said processor to selectively disable the constraint resolution engine from adjusting the display position information and size information.

18. For use in a computer system, an article of manufacture comprising a computer usable mass storage medium including computer-readable program code embodied therein for causing one or more processors to manage a graphical user interface (GUI) in the computer system, said computer readable program code, when executed by said one or more processors, causing said one or more processors to:

identify GUI elements to be displayed on a display of said computer system;

invoke procedures included in a hierarchy of spatial arrangement elements associated with the GUI elements to dynamically generate display position information and size information for each of the GUI elements;

adjust the display position information and the size information in a constraint resolution engine to determine a respective position on the display and a respective size for each of the GUI elements; and display each of the GUI elements on the display according to its respective position and its respective size.

19. The article of manufacture as claimed in claim 18 wherein said computer-readable program code which, when executed by said one or more processors, causes said one or more processors to invoke procedures included in a hierarchy of spatial arrangement elements, further causes said one or more processors to invoke procedures to dynamically generate a preferred dimension, a minimum dimension and a maximum dimension of each of the GUI elements.

20. The article of manufacture as claimed in claim 18 wherein said mass storage medium further includes program code which, when executed by said one or more processors, causes said one or more processors to selectively disable the constraint resolution engine from adjusting the display position information and size information.

* * * * *